(12) United States Patent
Robinson et al.

(10) Patent No.: US 7,072,590 B2
(45) Date of Patent: Jul. 4, 2006

(54) FIBER OPTIC RECEIVER WITH AN ADJUSTABLE BANDWIDTH POST-AMPLIFIER

(75) Inventors: Michael A. Robinson, Fremont, CA (US); Charles Graeme Ritchie, Ipswich (GB); Peter H Mahowald, Los Altos, CA (US)

(73) Assignee: Avago Technologies General IP Pte. Ltd., Singapore (SG)

( * ) Notice: Subject to any disclaimer, the term of this patent is extended or adjusted under 35 U.S.C. 154(b) by 826 days.

(21) Appl. No.: 09/818,433

(22) Filed: Mar. 26, 2001

(65) Prior Publication Data

US 2002/0135845 A1 Sep. 26, 2002

(51) Int. Cl.
*H04B 10/06* (2006.01)
(52) U.S. Cl. ...................... 398/202; 398/210
(58) Field of Classification Search ............... 375/317; 330/157–184, 75–112, 251–311; 398/202–214
See application file for complete search history.

(56) References Cited

U.S. PATENT DOCUMENTS

| | | | |
|---|---|---|---|
| 4,051,363 A | | 9/1977 | Fish |
| 4,912,525 A | * | 3/1990 | Pinoow .................... 398/110 |
| 5,088,107 A | | 2/1992 | Piasecki et al. |
| 5,166,819 A | * | 11/1992 | Eichel ..................... 398/202 |
| 5,311,353 A | | 5/1994 | Crawford |
| 5,455,705 A | | 10/1995 | Gusinov |
| 5,864,416 A | * | 1/1999 | Williams .................. 398/202 |
| 6,118,829 A | * | 9/2000 | North ....................... 375/317 |
| 6,304,357 B1 | * | 10/2001 | Ohhata et al. ............. 398/209 |
| 6,362,911 B1 | * | 3/2002 | Lee et al. .................. 398/208 |
| 6,396,351 B1 | * | 5/2002 | Buescher et al. .......... 330/308 |
| 6,462,852 B1 | * | 10/2002 | Paschal et al. ............. 398/202 |
| 6,540,412 B1 | * | 4/2003 | Yonemura et al. ......... 385/88 |

FOREIGN PATENT DOCUMENTS

| | | |
|---|---|---|
| EP | 0426035 A2 | 10/1990 |
| EP | 0541243 A1 | 10/1992 |
| EP | 1067726 A2 | 6/2000 |
| GB | 2198002 | 10/1987 |
| JP | 03270504 A | 12/1991 |
| JP | 8191278 A | 7/1996 |

\* cited by examiner

*Primary Examiner*—David C. Payne

(57) ABSTRACT

In one aspect, the invention features a fiber optic receiver that includes a preamplifier circuit incorporated together with an opto-electronic transducer in a receiver optical sub-assembly (ROSA), and an adjustable bandwidth post-amplifier that is located outside the ROSA to allow the overall size of the receiver package to be reduced. The ROSA is mounted on a substrate and is fitted with a fiber optic connector for coupling to a mating connector of a fiber optic cable. The opto-electronic transducer is incorporated within the ROSA and is configured to generate an electrical data signal in response to a received optical data signal. The preamplifier circuit is incorporated within the ROSA and is operable to linearly amplify an electrical data signal generated by the opto-electronic transducer. The adjustable bandwidth post-amplifier circuit is mounted on the substrate and is coupled to an output of the preamplifier circuit.

17 Claims, 3 Drawing Sheets

FIBER OPTIC RECEIVER WITH AN ADJUSTABLE BANDWIDTH POST-AMPLIFIER

TECHNICAL FIELD

This invention relates to fiber optic receivers and wideband receiver amplifiers subject to relatively tight packaging constraints.

BACKGROUND

Many advanced communication systems transmit information through a plurality of parallel optical communication channels. The optical communication channels may be defined by a fiber optic ribbon interconnect (or fiber optic cable) formed from a bundle of glass or plastic fibers, each of which is capable of transmitting data independently of the other fibers. Relative to metal wire interconnects, optical fibers have a much greater bandwidth, they are less susceptible to interference, and they are much thinner and lighter. Because of these advantageous physical and data transmission properties, efforts have been made to integrate fiber optics into computer system designs. For example, in a local area network, fiber optics may be used to connect a plurality of local computers to centralized equipment, such as servers and printers. In this arrangement, each local computer has an optical transceiver for transmitting and receiving optical information. The optical transceiver may be mounted on a substrate that supports one or more integrated circuits. Typically, each computer includes several substrates that are plugged into the sockets of a common backplane. The backplane may be active (i.e., it includes logic circuitry for performing computing functions) or it may be passive (i.e., it does not contain any logic circuitry). An external network fiber optic cable may be connected to the optical transceiver through a fiber optic connector that is coupled to the backplane.

Fiber optic transceivers typically include transmitter and receiver components. The transmitter component typically includes a laser, a lens assembly, and a circuit for driving the laser. The fiber optic receiver component typically includes a photodiode and a high gain receiver amplifier, which may be operable to perform one or more signal processing functions (e.g., automatic gain control, background current canceling, filtering or demodulation). For one-directional data transfer, a transmitter component is required at the originating end and a receiver component is required at the answering end. For bi-directional communication, a receiver component and a transmitter component are required at both the originating end and the answering end. In some cases, the transmitter circuitry and the receiver circuitry are implemented in a single transceiver integrated circuit (IC). The transceiver IC, photodiode and laser, along with the lenses for the photodiode and the laser are contained within a package that has a size that is sufficiently small to fit within a fiber optic communication device.

SUMMARY

In one aspect, the invention features a fiber optic receiver that includes a preamplifier circuit incorporated together with an opto-electronic transducer in a receiver optical sub-assembly (ROSA), and an adjustable bandwidth post-amplifier that is located outside the ROSA to allow the overall size of the receiver package to be reduced. The ROSA is mounted on a substrate and is fitted with a fiber optic connector for coupling to a mating connector of a fiber optic cable. The opto-electronic transducer is incorporated within the ROSA and is configured to generate an electrical data signal in response to a received optical data signal. The preamplifier circuit is incorporated within the ROSA and is operable to linearly amplify an electrical data signal generated by the opto-electronic transducer. The adjustable bandwidth post-amplifier circuit is mounted on the substrate and is coupled to an output of the preamplifier circuit.

Embodiments of the invention may include one or more of the following features.

In one embodiment, the post-amplifier circuit comprises a switch for setting a bandwidth response of the post-amplifier circuit in response to a received data rate control signal. The post-amplifier circuit further comprises a low-pass filter coupled to the switch. The low-pass filter preferably comprises a capacitor.

In another embodiment, the post-amplifier circuit comprises a wide bandwidth signal path and a narrow bandwidth signal path. The post-amplifier circuit preferably further comprises a multiplexer configured to selectively present for output electrical data signals transmitted over either the wide bandwidth signal path or the narrow bandwidth signal path in response to a received data rate control signal. The wide bandwidth signal path preferably comprises an amplifier with a relatively wide bandwidth response and the narrow bandwidth signal path preferably comprises an amplifier with a relatively narrow bandwidth response.

The post-amplifier may include an input gain buffer coupled to the output of the preamplifier circuit. The preamplifier circuit preferably is configured to linearly amplify an electrical data signal generated by the opto-electronic transducer over a specified range of optical data signal power. The ROSA may include a header module that is mounted on the substrate and is configured to house the opto-electronic transducer and the preamplifier. The opto-electronic transducer preferably includes a photodiode.

Among the advantages of the invention are the following.

The invention provides a fiber optic receiver that accommodates multiple data rates while conforming to existing receiver optical sub-assembly (ROSA) size and pin count constraints. In addition, the inventive placement of the adjustable bandwidth amplifier outside the ROSA enables the analog electrical data signals generated by the opto-electronic transducer to be amplified and shaped properly for data recovery, while allowing the receiver to be housed within a package sized to fit within fiber optic communication devices with significant size constraints.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments or relative dimensions of the depicted elements, and are not drawn to scale.

Figure 1:
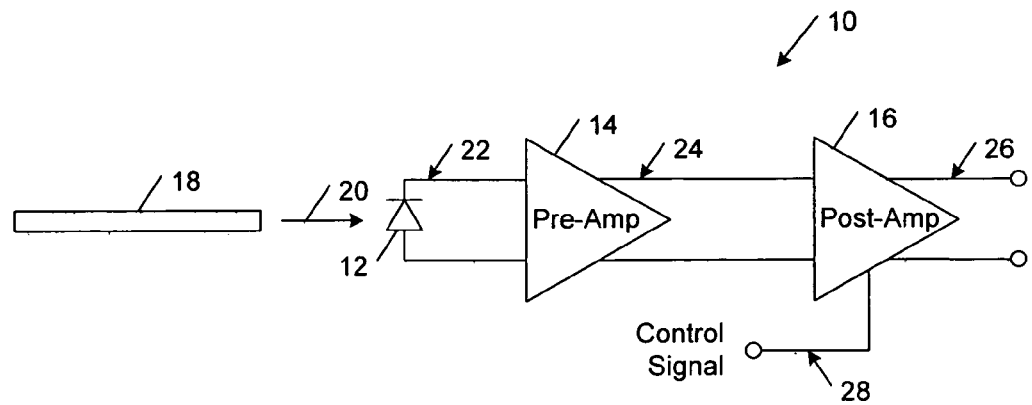
FIG. 1 is a diagrammatic view of a fiber optic receiver, which includes an optoelectronic transducer, a preamplifier circuit and a post-amplifier circuit, and a fiber optic cable carrying an optical data signal to the fiber optic receiver.

Referring to FIG. 1, in one embodiment, a fiber optic receiver 10 includes an opto-electronic transducer 12 (e.g., a p-i-n photodiode), a preamplifier circuit 14, and an adjustable bandwidth post-amplifier circuit 16. In operation, a fiber optic cable 18 carries an optical data signal 20 to opto-electronic transducer 12. In response to optical data signal 20, opto-electronic transducer 12 generates an electrical data signal 22, which is amplified by preamplifier circuit 14. Preamplifier circuit 14 is configured to linearly amplify electrical data signal 22 over a prescribed range of optical power for optical data signal 20. The resulting pre-amplified electrical data signal 24 is further amplified by post-amplifier circuit 16, which amplifies and shapes electrical data signal 24 so that data embedded in output signal 26 may be extracted by a conventional clock and data recovery circuit.

As explained in detail below, post-amplifier circuit has an adjustable bandwidth response that may be set by a data rate control signal 28 to optimize the performance of fiber optic receiver 10 for different data rates. For example, in one embodiment, when the data rate of the received optical data signal 20 is high, the cutoff frequency of post-amplifier 16 is set high (e.g., about 1.5 GHz to about 2.5 GHz), whereas when the data rate is low, the cutoff frequency of post-amplifier circuit 16 is set low (e.g., about 0.5 GHz to about 1.5 GHz). The data rate of optical data signal 20 may be known a priori or may be extracted by a phase-locked loop or other techniques in the clock and data recovery circuit.

Figure 2A:
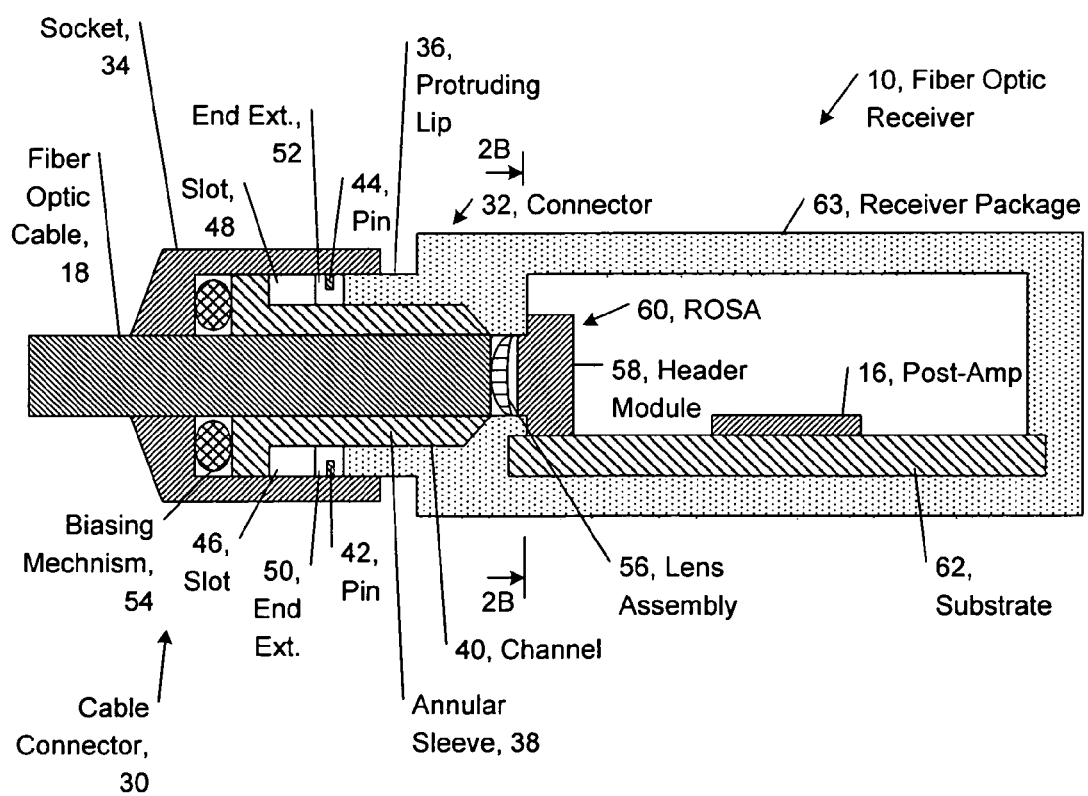
FIG. 2A is a diagrammatic cross-sectional side view of a fiber optic cable coupled by a pair of mating connectors to a receiver optical sub-assembly (ROSA) of the fiber optic receiver of FIG. 1.

As shown in FIG. 2A, in one embodiment, fiber optic cable 18 includes a cable connector 30 that couples to a mating receiver connector 32 of fiber optic receiver 10. Cable connector 30 includes a socket 34 that is configured to slide over a protruding lip 36 of receiver connector 32. An annular sleeve 38 is disposed about the distal end of fiber optic cable 18 and is configured to slide within a channel 40 defined within receiver connector 32. Socket 34 has a pair of pins 42, 44 that are slidable within vertical slots 46, 48 of lip 36. Socket 34 may be slid over lip 36, with pins 42, 44 aligned with slots 46, 48, until pins 42, 44 reach the ends of slots 46, 48. Socket 34 then may be rotated to seat pins 42, 44 in end extensions 50, 52 of slots 46, 48. The process of seating pins 42, 44 within end extensions 50, 52 compresses a biasing mechanism 54 (e.g., a rubber o-ring) that urges socket 34 against receiver connector 32, effectively locking cable connector 30 to receiver connector 32. When properly seated within channel 40, the one or more fibers of fiber optic cable 18 are aligned with a lens assembly 56, which focuses optical data signals 20 onto opto-electronic transducer 12.

Figure 2B:
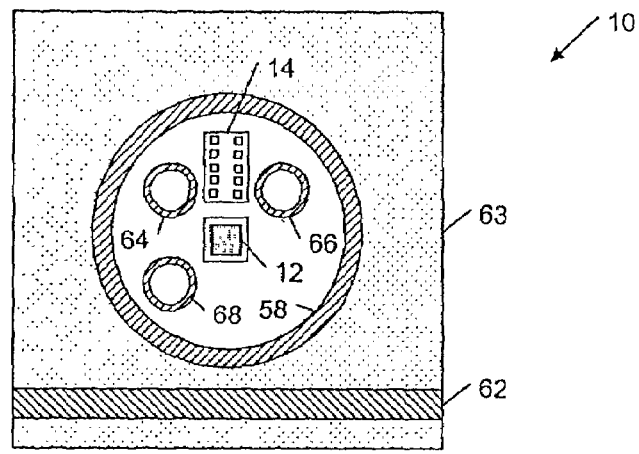
FIG. 2B is a diagrammatic cross-sectional end view of a header module of the ROSA of FIG. 2A taken along the line 2B—2B.

Referring to FIG. 2B, opto-electronic transducer 12 and preamplifier circuit 14 are housed within a header module 58 of a receiver optical sub-assembly (ROSA) 60, which is mounted on a substrate 62 (e.g., a printed circuit board or other support for passive and active components) of fiber optic receiver 10. ROSA 60 and substrate 62 are contained within a receiver package 63. Opto-electronic transducer 12 is mounted centrally within ROSA 60 to receive optical data signals carried by fiber optic cable 18 that are focused by lens 56. ROSA 60 also includes a plurality of insulated posts 64, 66, 68, which define channels through which electrical connectors extend to couple substrate 62 to opto-electronic transducer 12 and preamplifier circuit 14. Because the bandwidth limiting circuitry needed to amplify and shape the analog signals received from opto-electronic transducer 12 is placed within post-amplifier circuit 16, the space within ROSA 60 that is needed to contain opto-electronic transducer 12 and preamplifier circuit 14 may be reduced and, as a result, receiver package 63 may be constructed with a relatively small size.

Figure 3:
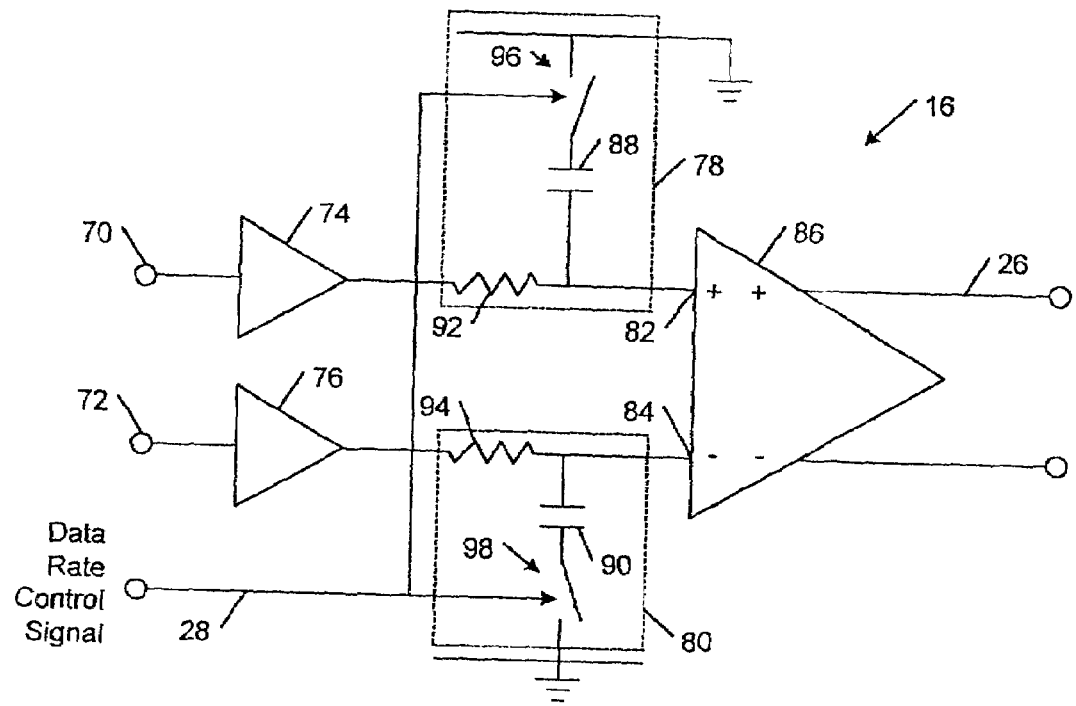
FIG. 3 is a circuit diagram of the post-amplifier circuit of FIG. 1.

Referring to FIG. 3, in one embodiment, post-amplifier circuit 16 includes a positive input 70 and a negative input 72, each of which is coupled to a respective input gain buffer 74, 76. The outputs of gain buffers 74, 76 are coupled to low-pass filters 78, 80 and the inputs 82, 84 of a high gain amplifier 86, respectively. Low-pass filters 78, 80 each includes a capacitor 88, 90 and a resistor 92, 94 coupled in series. Low-pass filters 78, 80 also include respective switches 96, 98, which are configured to selectively set the bandwidth response of post-amplifier circuit 16 in accordance with the value of data rate control signal 28. In operation, when the data rate of the received optical data signal 20 is high, data rate control signal 28 is low, which opens switches 96, 98 to disconnect capacitors 88, 90 from the signal paths through post-amplifier circuit 16. As a result, the cutoff frequency of post-amplifier 16 is set high (e.g., about 1.5 GHz to about 2.5 GHz). When the data rate is low, data rate control signal 28 is set high, which closes switches 96, 98 to connect capacitors 88, 90 to the signal paths through post-amplifier circuit 16. As a result, the cutoff frequency of post-amplifier circuit 16 is set low (e.g., about 0.5 GHz to about 1.5 GHz).

Figure 4:
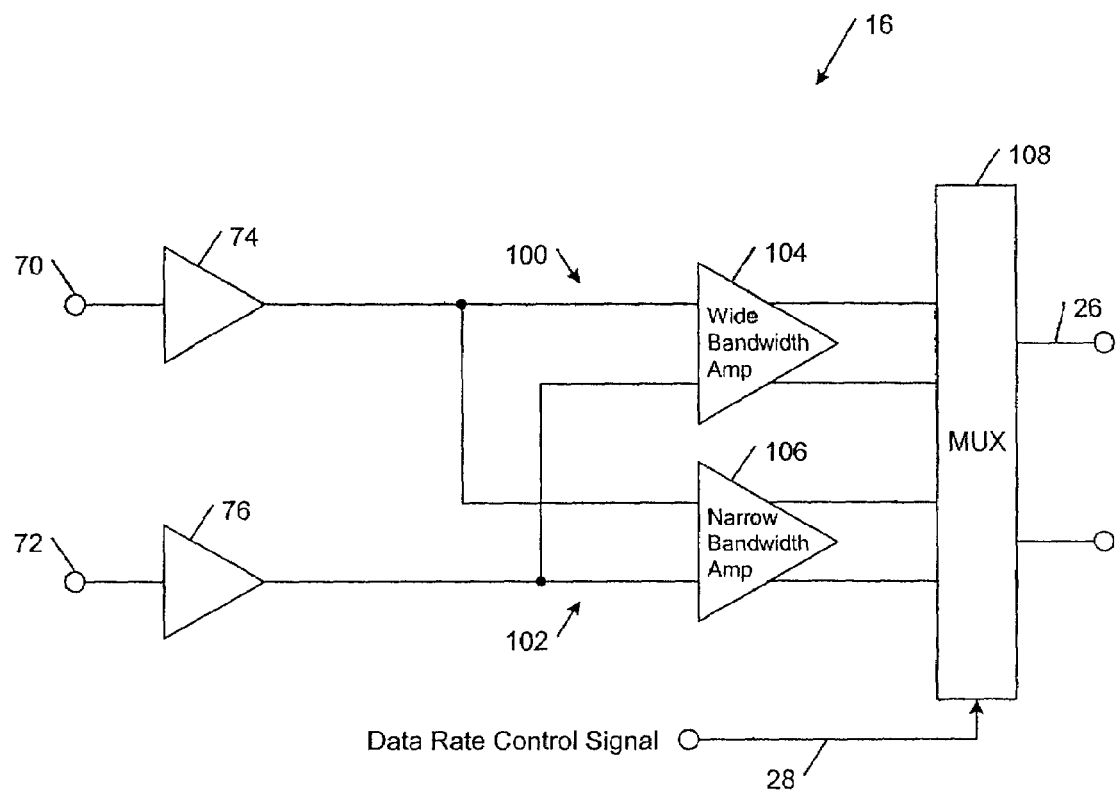
FIG. 4 is a circuit diagram of an alternative post-amplifier circuit.

Referring to FIG. 4, in another embodiment, post-amplifier circuit 16 includes a wide bandwidth signal path 100 and a narrow bandwidth signal path 102. Wide bandwidth signal path 100 includes an amplifier 104 that is characterized by a relatively high cutoff frequency (e.g., about 1.5 GHz to about 2.5 GHz) and narrow bandwidth signal path 102 includes an amplifier 106 that is characterized by a relatively low cutoff frequency (e.g., about 0.5 GHz to about 1.5 GHz). Post-amplifier circuit 16 also includes a multiplexer 108, which is configured to selectively present for output electrical data signals carried by one of wide bandwidth signal path 100 and narrow bandwidth signal path 102 in response to the value of data rate control signal 28. In particular, when the data rate of the received optical data signal 20 is high, data rate control signal 28 is high. As a result, multiplexer 108 presents for output the electrical data signals carried by wide bandwidth signal path 100. When the data rate of the received optical data signal 20 is low, data rate control signal 28 is low. As a result multiplexer 108 presents for output the electrical data signals carried by narrow bandwidth signal path 102.

Receiver 10 may be housed within a standalone receiver package or may be housed together with a transmitter component in a transceiver package.

Other embodiments are within the scope of the claims.

For example, although the above-embodiments are described in connection with a post-amplifier circuit with two different bandwidth responses, other embodiments may include post-amplifiers with more than two different bandwidth responses. Furthermore, other post-amplifiers may have a continuously variable bandwidth response, rather than a discrete variation in bandwidth response. The bandwidth response of the post-amplifier circuit also may be adjusted in different ways. For example, the bandwidth response may be adjusted by varying the bias conditions of a variable transconductance transistor in the post-amplifier circuit. Alternatively, the bandwidth response may be adjusted by varying the bias voltage applied to a varactor (voltage-variable capacitor) in the post-amplifier circuit. In addition, instead of varying capacitance values as in the above-described embodiments, the resistance values in the low-pass filters coupled to the signal paths through the post-amplifier circuit may be varied. The bandwidth response alternatively may be adjusted by varying the gain of an amplifier within the post-amplifier circuit.

Other embodiments may use fiber optic connectors that are different from the bayonet-type connectors 30, 32 to couple fiber optic cable 18 to receiver 10.

What is claimed is:

1. A fiber optic receiver, comprising:
   a substrate;
   a receiver optical sub-assembly (ROSA) mounted on the substrate and comprising a fiber optic connector for coupling to a mating connector of a fiber optic cable;
   an opto-electronic transducer incorporated within the ROSA and configured to generate an electrical data signal in response to a received optical data signal over a specified range of optical power;
   a preamplifier circuit incorporated within the ROSA, coupled to the opto-electronic transducer, and operable to linearly amplify the electrical data signal generated by the opto-electronic transducer over the specified range of optical power; and
   an adjustable bandwidth post-amplifier circuit mounted on the substrate and coupled to an output of the preamplifier circuit.

2. The fiber optic receiver of claim 1, wherein the post-amplifier circuit comprises a switch for setting a bandwidth response of the post-amplifier circuit in response to a received data rate control signal.

3. The fiber optic receiver from claim 2, wherein the post-amplifier circuit further comprises a low-pass filter coupled to the switch.

4. The fiber optic receiver of claim 3, wherein the low-pass filter comprises a capacitor.

5. The fiber optic receiver of claim 1, wherein the post-amplifier circuit comprises a voltage-variable capacitor.

6. The fiber optic receiver of claim 1, wherein the post-amplifier circuit comprises a wide bandwidth signal path and a narrow bandwidth signal path.

7. The fiber optic receiver of claim 6, wherein the post-amplifier circuit further comprises a multiplexer configured to selectively present for output electrical data signals transmitted over one of the wide bandwidth signal path and the narrow bandwidth signal path in response to a received data rate control signal.

8. The fiber optic receiver of claim 6, wherein the wide bandwidth signal path comprises an amplifier with a relatively wide bandwidth response and the narrow bandwidth signal path comprises an amplifier with a relatively narrow bandwidth response.

9. The fiber optic receiver of claim 1, wherein the post-amplifier comprises an input gain buffer coupled to the output of the preamplifier circuit.

10. The fiber optic receiver of claim 1, wherein the ROSA comprises a header module mounted on the substrate and housing the opto-electronic transducer and the pre-amplifier circuit.

11. The fiber optic receiver of claim 1, wherein the opto-electronic transducer comprises a photodiode.

12. The fiber optic receiver of claim 1, wherein the adjustable bandwidth post-amplifier circuit is located outside of the ROSA.

13. The fiber optic receiver of claim 6, wherein each of the wide bandwidth signal path and the narrow bandwidth signal path is connected to the output of the pre-amplifier circuit.

14. The fiber optic receiver of claim 10, further comprising electrical connectors extending from the opto-electronic transducer and the pre-amplified circuit, through the header module, and to the substrate.

15. The fiber optic receiver of claim 1, wherein the post-amplifier circuit has a high bandwidth state characterized by a first cutoff frequency and a low bandwidth state characterized by a second cutoff frequency lower than the first cutoff frequency.

16. The fiber optic receiver of claim 15, wherein the first cutoff frequency is in a range of 1.5 GHz to 2.5 GHz and the second cutoff frequency is in a range of 0.5 GHz to 1.5 GHz.

17. The fiber optic receiver of claim 15, further comprising a switch configured to set the post-amplifier circuit in the high bandwidth state when a received data rate control signal corresponds to a first data rate of the optical data signal and to set the post-amplifier circuit in the low bandwidth state when the received data rate control signal corresponds to a second data rate of the optical data signal lower than the first data rate.

* * * * *

UNITED STATES PATENT AND TRADEMARK OFFICE
CERTIFICATE OF CORRECTION

| | | |
|---|---|---|
| PATENT NO. | : 7,072,590 B2 | Page 1 of 1 |
| APPLICATION NO. | : 09/818433 | |
| DATED | : July 4, 2006 | |
| INVENTOR(S) | : Michael A. Robinson et al. | |

It is certified that error appears in the above-identified patent and that said Letters Patent is hereby corrected as shown below:

Column 6, Line 29, Claim 14, delete "pre-amplified" and insert -- pre-amplifier --.

Signed and Sealed this

First Day of June, 2010

David J. Kappos
*Director of the United States Patent and Trademark Office*